US012723162B2

(12) United States Patent
Liao et al.

(10) Patent No.: US 12,723,162 B2
(45) Date of Patent: Sep. 1, 2026

(54) HIGH-TEMPERATURE-RESISTANT AND ANTI-CORROSION COATING MATERIAL AND METHOD FOR MANUFACTURING THE SAME

(71) Applicant: NAN YA PLASTICS CORPORATION, Taipei (TW)

(72) Inventors: Te-Chao Liao, Taipei (TW); Chun-Che Tsao, Taipei (TW); Yueh-Shin Liu, Taipei City (TW); Yi-Chen Chou, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 352 days.

(21) Appl. No.: 18/641,534

(22) Filed: Apr. 22, 2024

(65) Prior Publication Data

US 2025/0215239 A1 Jul. 3, 2025

(30) Foreign Application Priority Data

Dec. 27, 2023 (TW) ................................ 112150906

(51) Int. Cl.

| | |
|---|---|
| ***C09D 5/08*** | (2006.01) |
| ***C08K 5/5419*** | (2006.01) |
| ***C08K 13/04*** | (2006.01) |
| ***C09D 7/20*** | (2018.01) |
| ***C09D 7/61*** | (2018.01) |
| ***C09D 7/63*** | (2018.01) |
| ***C09D 7/80*** | (2018.01) |
| ***C09D 183/06*** | (2006.01) |

(52) U.S. Cl.
CPC .............. *C09D 5/08* (2013.01); *C08K 5/5419* (2013.01); *C08K 13/04* (2013.01); *C09D 7/20* (2018.01); *C09D 7/61* (2018.01); *C09D 7/63* (2018.01); *C09D 7/80* (2018.01); *C09D 183/06* (2013.01); *C08K 2201/003* (2013.01)

(58) Field of Classification Search
CPC ... C09D 5/08; C09D 7/20; C09D 7/61; C09D 7/63; C09D 7/80; C09D 183/06; C09D 183/04; C09D 5/10; C09D 5/18; C09D 7/70; C08K 5/5419; C08K 13/04; C08K 2201/003; C08K 2003/0812; C08K 2003/0893; C08G 77/04; C08G 77/80; C08L 83/04
See application file for complete search history.

(56) References Cited

U.S. PATENT DOCUMENTS

2009/0017315 A1* 1/2009 Hamilton ............. C09D 183/04 428/447

FOREIGN PATENT DOCUMENTS

| | | | | | |
|---|---|---|---|---|---|
| CN | 100383205 | C | | 4/2008 | |
| CN | 106752201 | A | * | 5/2017 | ............... C09D 7/63 |
| CN | 108384453 | A | * | 8/2018 | ........... C09D 183/10 |
| CN | 115651537 | A | | 1/2023 | |
| JP | 6323975 | A | | 2/1988 | |
| JP | 63270774 | A | | 11/1988 | |
| JP | 5255638 | A | | 10/1993 | |
| JP | 1095953 | A | | 4/1998 | |
| JP | 11279488 | A | | 10/1999 | |
| JP | 2002129110 | A | | 5/2002 | |
| JP | 200683319 | A | | 3/2006 | |
| JP | 2012219126 | A | | 11/2012 | |
| JP | 2016533001 | A | | 10/2016 | |
| PL | 165983 | B1 | * | 3/1995 | ............... C09D 5/08 |
| WO | WO2017208824 | A1 | | 12/2017 | |

* cited by examiner

*Primary Examiner* — Anthony J Green
(74) *Attorney, Agent, or Firm* — Li & Cai Intellectual Property (USA) Office

(57) ABSTRACT

A high-temperature-resistant and anti-corrosion coating material and a method for manufacturing the same are provided. The high-temperature-resistant and anti-corrosion coating material includes: 20 wt % to 40 wt % of a heat-resistant silicone resin; 30 wt % to 45 wt % of fillers; 0.5 wt % to 5 wt % of a film-forming aid; and 15 wt % to 30 wt % of a solvent. The fillers include metal fillers and sheet fillers, and a weight ratio of the metal fillers to the sheet fillers ranges between 1:2 and 1:3.

20 Claims, No Drawings

HIGH-TEMPERATURE-RESISTANT AND ANTI-CORROSION COATING MATERIAL AND METHOD FOR MANUFACTURING THE SAME

CROSS-REFERENCE TO RELATED PATENT APPLICATION

This application claims the benefit of priority to Taiwan Patent Application No. 112150906, filed on Dec. 27, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a high-temperature-resistant and anti-corrosion coating material and a method for manufacturing the same, and more particularly to a high-temperature-resistant and anti-corrosion coating material that is an organic type and a method for manufacturing the same.

BACKGROUND OF THE DISCLOSURE

In chemical plants, metal storage tanks are often used for storage of chemical materials, and apparatuses can be connected to each other via pipelines, so as to conduct chemistry-related processes. In order to improve the durability of the metal storage tanks, the pipelines, and the apparatuses, an inorganic ceramic-based anti-corrosion coating material is conventionally coated onto the surface of the metal storage tanks, the pipelines, and the apparatuses.

However, adhesion between the inorganic ceramic-based anti-corrosion coating material and an organic surface-layer coating material is poor. After short-term use, problems such as poor adhesion and formation of pinholes, blisters, and cracks on the surface may occur. After long-term use, there is the possibility of peeling off and damage of a coating. In addition, since assembly lines in the chemical plants are often subjected to a high temperature, the anti-corrosion coating material still needs to be high-temperature resistant.

Therefore, how to enhance coating adhesion and achieve effects of high-temperature resistance, anti-corrosion, energy saving, and carbon reduction through improvements in formula composition, so as to overcome the above-mentioned problems, has become one of the important issues to be solved in the relevant industry.

SUMMARY OF THE DISCLOSURE

In response to the above-referenced technical inadequacies, the present disclosure provides a high-temperature-resistant and anti-corrosion coating material and a method for manufacturing the same.

In order to solve the above-mentioned problems, one of the technical aspects adopted by the present disclosure is to provide a high-temperature-resistant and anti-corrosion coating material. The high-temperature-resistant and anti-corrosion coating material includes: 20 wt % to 40 wt % of a heat-resistant silicone resin; 30 wt % to 45 wt % of fillers; 0.5 wt % to 5 wt % of a film-forming aid; and 15 wt % to 30 wt % of a solvent. The fillers include metal fillers and sheet fillers, and a weight ratio of the metal fillers to the sheet fillers ranges between 1:2 and 1:3.

In one of the possible or preferred embodiments, the heat-resistant silicone resin is a methyl-phenyl-modified silicone resin, an epoxy resin-modified silicone resin, and a polyester-modified silicone resin.

In one of the possible or preferred embodiments, in the methyl-phenyl-modified silicone resin, a content of methyl ranges between 20% and 35%, and a content of phenyl ranges between 65% and 80%.

In one of the possible or preferred embodiments, a viscosity of the methyl-phenyl-modified silicone resin ranges between 20 $mm^2/s$ and 100 $mm^2/s$.

In one of the possible or preferred embodiments, the fillers are selected from the group consisting of an aluminum powder, a zinc powder, a talc powder, aluminum magnesium talc, magnesium talc, glass flakes, and silicone talc.

In one of the possible or preferred embodiments, the sheet fillers include magnesium talc and glass flakes.

In one of the possible or preferred embodiments, a weight ratio of the magnesium talc to the glass flakes ranges between 2:1 and 1:2.

In one of the possible or preferred embodiments, a diameter of the glass flake is greater than a diameter of the magnesium talc.

In one of the possible or preferred embodiments, a diameter of the magnesium talc ranges between 3 μm and 5 μm, and a diameter of the glass flake ranges between 10 μm and 20 μm.

In one of the possible or preferred embodiments, the film-forming aid is selected from the group consisting of alcohol ethers, alcohol zirconium, a mixture of 2-butoxyethanol and dipropylene glycol butyl ether, and a plasticizer.

In one of the possible or preferred embodiments, the solvent is selected from the group consisting of toluene, xylene, and an aromatic solvent.

In one of the possible or preferred embodiments, the high-temperature-resistant and anti-corrosion coating material further includes a curing catalyst. A content of the curing catalyst is 0.5 wt % to 2 wt % of the heat-resistant silicone resin.

In order to solve the above-mentioned problems, another one of the technical aspects adopted by the present disclosure is to provide a method for manufacturing a high-temperature-resistant and anti-corrosion coating material. The method includes: preparing 30 wt % to 45 wt % of fillers based on a weight ratio of metal fillers to sheet fillers within a range between 1:2 and 1:3; pre-dispersing 20 wt % to 40 wt % of a heat-resistant silicone resin, the sheet fillers, and 0.5 wt % to 5 wt % of a film-forming aid, so as to obtain a pre-dispersion; and adding the metal fillers and 15 wt % to 30 wt % of a solvent into the pre-dispersion, and stirring evenly, so as to obtain the high-temperature-resistant and anti-corrosion coating material.

In one of the possible or preferred embodiments, a refractive index of the heat-resistant silicone resin ranges between 1.40 and 1.53, and a viscosity of the heat-resistant silicone resin ranges between 20 $mm^2/s$ and 100 $mm^2/s$.

In one of the possible or preferred embodiments, the heat-resistant silicone resin is a methyl-phenyl-modified silicone resin. In the methyl-phenyl-modified silicone resin, a content of methyl ranges between 20% and 35%, and a content of phenyl ranges between 65% and 80%.

In one of the possible or preferred embodiments, the sheet fillers include magnesium talc and glass flakes, and a weight ratio of the magnesium talc to the glass flakes ranges between 2:1 and 1:2.

In one of the possible or preferred embodiments, the film-forming aid is selected from the group consisting of alcohol ethers, alcohol zirconium, a mixture of 2-butoxyethanol and dipropylene glycol butyl ether, and a plasticizer.

In one of the possible or preferred embodiments, the solvent is selected from the group consisting of toluene, xylene, and an aromatic solvent.

In one of the possible or preferred embodiments, the method further includes: adding a curing catalyst into the high-temperature-resistant and anti-corrosion coating material before use. A content of the curing catalyst is 0.5 wt % to 2 wt % of the heat-resistant silicone resin.

In one of the possible or preferred embodiments, the curing catalyst is alkoxysilane.

Therefore, in the high-temperature-resistant and anti-corrosion coating material and the method for manufacturing the same provided by the present disclosure, by virtue of "the fillers including metal fillers and sheet fillers" and "a weight ratio of the metal fillers to the sheet fillers ranging between 1:2 and 1:3," the high-temperature-resistant and anti-corrosion coating material can have improved adhesion and an improved anti-corrosion effect.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

A first embodiment of the present disclosure provides a high-temperature-resistant and anti-corrosion coating material, which includes a heat-resistant silicone resin, fillers, a film-forming aid, and a solvent. In order to meet an operating temperature (within a range between 200° C. and 300° C.) often used in chemical plants, high-temperature resistance or heat resistance mentioned in the present disclosure refers to resistance against a temperature of approximately 450° C. The heat-resistant silicone resin can be a methyl-phenyl-modified silicone resin, an epoxy resin-modified silicone resin, and a polyester-modified silicone resin.

Specifically, based on a total weight of the high-temperature-resistant and anti-corrosion coating material, a content of the heat-resistant silicone resin ranges between 20 wt % and 40 wt %. That is, the content of the heat-resistant silicone resin can be any positive real number ranging between 20 wt % and 40 wt %, e.g., 20 wt %, 25 wt %, 30 wt %, 35 wt %, or 40 wt %. If the content of the heat-resistant silicone resin is less than 20 wt %, the fluidity of the high-temperature-resistant and anti-corrosion coating material is not conducive to coating. If the content of the heat-resistant silicone resin is greater than 40 wt %, the high-temperature-resistant and anti-corrosion coating material does not have sufficient high-temperature resistance. In one exemplary embodiment, the content of the heat-resistant silicone resin ranges between 25 wt % and 35 wt %.

It should be noted that, when the heat-resistant silicone resin is the methyl-phenyl-modified silicone resin, based on a total weight of methyl and phenyl in the heat-resistant silicone resin, a content of the methyl ranges between 20% and 35%, and a content of the phenyl ranges between 65% and 80%. The methyl-phenyl-modified silicone resin obtained in this manner has a viscosity ranging between 20 $mm^2/s$ and 100 $mm^2/s$. If the content of the methyl is less than 20% or the content of the phenyl is greater than 80%, a texture of the methyl-phenyl-modified silicone resin becomes hard and brittle. If the content of the methyl is greater than 35% or the content of the phenyl is less than 65%, the viscosity of the methyl-phenyl-modified silicone resin may be too low for coating, and the heat resistance is also not sufficient. In one exemplary embodiment, the content of the methyl ranges between 25% and 30%, and the content of the phenyl ranges between 70% and 75%, so that the methyl-phenyl-modified silicone resin of the present disclosure can have the optimal hardness and heat resistance.

In other words, the content of the methyl affects the flexibility of a resin, and the content of the phenyl affects the heat resistance of the resin. In the present disclosure, how the high-temperature-resistant and anti-corrosion coating material is affected by a ratio of the methyl to the phenyl in the high-temperature-resistant and anti-corrosion coating material is further examined. The ratios of the methyl to the phenyl and experiment results thereof are shown in Table 1.

In Table 1, the high-temperature-resistant and anti-corrosion coating material includes 27 wt % of the heat-resistant silicone resin, 40 wt % of the fillers, 3 wt % of the film-forming aid, and 30 wt % of the solvent. The heat-resistant silicone resin in which the ratio of the methyl to the phenyl is 28:72 can be the model KR-500 produced by Shin-Etsu Chemical Co., Ltd., the heat-resistant silicone resin in which the ratio of the methyl to the phenyl is 15:85 can be the model X-40-9227 produced by Shin-Etsu Chemical Co., Ltd., and the heat-resistant silicone resin in which the ratio of the methyl to the phenyl is 40:60 can be the model KR-515 produced by Shin-Etsu Chemical Co., Ltd. Here, metal fillers are an aluminum powder, and sheet fillers are a mixture of magnesium talc and glass flakes (a weight ratio of the metal fillers to the sheet fillers is 1:2, and a weight ratio of the magnesium talc to the glass flakes is 1:1). The film-forming aid is polyether-modified polydimethylsiloxane, and the solvent is toluene.

TABLE 1

| Ratio of methyl to phenyl (%) | 28:72 | 15:85 | 40:60 |
|---|---|---|---|
| Pencil hardness of surface layer | 4H | 5H | 2H |
| Testing of adhesive force (cross-cut test) | 5B | 4B | 4B |
| Pull-out force (MPa) at a high temperature of 450° C. for 24 hours | 3.8 | 2.4 | 1.4 |

In Table 1, when the content of the methyl is 28%, and the content of the phenyl is 72%, a pencil hardness of a surface layer is most appropriate (4H), and an adhesive force and a pull-out force can also be sufficiently high. That is, in one exemplary embodiment of the present disclosure, the ratio of the methyl to the phenyl is 7:18. In comparison, when the content of the methyl is 15%, and the content of the phenyl is 85%, a texture of the resin is harder and more brittle. When the content of the methyl is 40%, and the content of the phenyl is 60%, the pencil hardness of the surface layer is too soft, and the pull-out force is also too low for providing sufficient adhesion. In one embodiment of the present disclosure, a specific gravity of the methyl-phenyl-modified silicone resin ranges between 1.08 and 1.12, and a refractive index of the methyl-phenyl-modified silicone resin ranges between 1.40 and 1.53.

In order to enhance anti-corrosion ability of the high-temperature-resistant and anti-corrosion coating material, a high-temperature-resistant and anti-corrosion coating of the present disclosure can contain the fillers. Based on the total weight of the high-temperature-resistant and anti-corrosion coating material, a content of the fillers ranges between 30 wt % and 45 wt %. That is, the content of the fillers can be any positive real number ranging between 30 wt % and 45 wt %, e.g., 30 wt %, 32 wt %, 34 wt %, 36 wt %, 38 wt %, 40 wt %, 42 wt %, 44 wt %, or 45 wt %. If the content of the fillers is less than 30 wt %, the required anti-corrosion effect cannot be achieved. If the content of the fillers is greater than 40 wt %, a film-forming property of the high-temperature-resistant and anti-corrosion coating material may be affected. In one exemplary embodiment, the content of the fillers ranges between 35 wt % and 40 wt %.

For example, the fillers can be selected from the group consisting of an aluminum powder, a zinc powder, a talc powder, aluminum magnesium talc, magnesium talc, glass flakes, and silicone talc. It should be noted that the metal fillers and the sheet fillers can be used in combination with each other in the high-temperature-resistant and anti-corrosion coating material of the present disclosure, so as to further enhance its high-temperature resistance. In the present disclosure, how the high-temperature-resistant and anti-corrosion coating material is affected by a ratio of the metal fillers to the sheet fillers in the high-temperature-resistant and anti-corrosion coating material is examined. The ratios of the metal fillers to the sheet fillers and experiment results thereof are shown in Table 2. A formula of the high-temperature-resistant and anti-corrosion coating material in Table 2 is substantially the same as that of Table 1, but only the ratio of the metal fillers to the sheet fillers is changed. That is, a total amount of the metal fillers and the sheet fillers in the coating material is still 40 wt %, and tests are conducted by changing the ratio of the metal fillers to the sheet fillers in the fillers.

TABLE 2

| Metal fillers:Sheet fillers | 1:1 | 1:2 | 1:3 | 1:4 |
|---|---|---|---|---|
| Pencil hardness of surface layer | 5H | 4H | 4H | 2H |
| Testing of adhesive force (cross-cut test) | 4B | 5B | 5B | 5B |
| Pull-out force (MPa) at a high temperature of 450° C. for 24 hours | 2.9 | 4.1 | 3.7 | 2.3 |

As shown in Table 2, when the ratio of the metal fillers to the sheet fillers is 1:1, the hardness is high, and the adhesive force and the pull-out force remain to be improved. When the ratio of the metal fillers to the sheet fillers is 1:4, the hardness is low, and the pull-out force is worsened (dripping is likely to occur during a coating process) whereas the adhesive force is improved as compared with the ratio of 1:1. However, when the ratio of the metal fillers to the sheet fillers is 1:2 and 1:3, the pencil hardness of the surface layer is most appropriate (4H), and the adhesive force and the pull-out force are also sufficiently high. As such, the weight ratio of the metal fillers to the sheet fillers preferably ranges between 1:2 and 1:3.

Furthermore, the sheet fillers include the magnesium talc and the glass flakes. Since a diameter of the glass flake is greater than a diameter of the magnesium talc (i.e., the magnesium talc and the glass flake have different diameters), the magnesium talc having a small diameter can be filled in gaps between the glass flakes having a large diameter. In this way, the fillers as a whole can be more densely adhered to a coating surface, thereby decreasing a gas transmission rate and a water vapor transmission rate. Specifically, the diameter of the magnesium talc ranges between 3 μm and 5 μm, and the diameter of the glass flake ranges between 10 μm and 20 μm. The diameter mentioned in the present disclosure is an average diameter ($D_{50}$). Ratios of the magnesium talc to the glass flakes in the high-temperature-resistant and anti-corrosion coating material are examined in the present disclosure, and said ratios and experiment results thereof are shown in Table 3. A formula of the high-temperature-resistant and anti-corrosion coating material in Table 3 is substantially the same as that of Table 1, but only the ratio of the magnesium talc to the glass flakes in the sheet fillers is changed and tested.

TABLE 3

| Magnesium talc:Glass flakes | 1:0 | 2:1 | 1:1 | 1:2 | 0:1 |
|---|---|---|---|---|---|
| OTR (oxygen transmission rate)(%) | 12.57 | 4.78 | 2.30 | 3.61 | 8.91 |
| WVTR (water vapor transmission rate)(%) | 18.71 | 6.89 | 4.05 | 5.13 | 10.78 |

As shown in Table 3, when only the magnesium talc or the glass flakes are used (i.e., the ratio of the magnesium talc to the glass flakes is 1:0 or 0:1), the gas transmission rate and the water vapor transmission rate are high. That is, the high-temperature-resistant and anti-corrosion coating material has a poor anti-corrosion effect. However, when the magnesium talc and the glass flakes are used in a mixed manner, the gas transmission rate and the water vapor transmission rate can both be decreased to less than 7%. Such results indicate that when the weight ratio of the magnesium talc to the glass flakes ranges between 2:1 and 1:2, the high-temperature-resistant and anti-corrosion coating material can have a low gas transmission rate and a low water vapor transmission rate, thereby achieving improved protection and anti-corrosion effects.

The high-temperature-resistant and anti-corrosion coating material of the present disclosure can also include the film-forming aid, so as to prevent easy dripping during the coating process or formation of cracks or damages when being dried. For example, the film-forming aid can be selected from the group consisting of alcohol ethers, alcohol zirconium, a mixture of 2-butoxyethanol and dipropylene glycol butyl ether, and a plasticizer. However, the aforementioned examples describe only one of the embodiments of the present disclosure, and the present disclosure is not intended to be limited thereto.

Specifically, based on the total weight of the high-temperature-resistant and anti-corrosion coating material, a content of the film-forming aid ranges between 0.5 wt % and 5 wt %. That is, the content of the film-forming aid can be any positive real number ranging between 0.5 wt % and 5 wt %, e.g., 0.5 wt %, 1 wt %, 1.5 wt %, 2 wt %, 2.5 wt %, 3 wt %, 3.5 wt %, 4 wt %, 4.5 wt %, or 5 wt %. If the content of the film-forming aid is less than 0.5 wt %, the film-forming aid cannot be effectively conducive to the film-forming property of the high-temperature-resistant and anti-corrosion coating material. If the content of the film-forming aid is greater than 5 wt %, the manufacturing costs of the high-temperature-resistant and anti-corrosion coating material can be increased. In one exemplary embodiment, the content of the film-forming aid ranges between 2 wt % and 3.5 wt %.

In response to the heat-resistant silicone resin, a curing catalyst can be further added into the high-temperature-resistant and anti-corrosion coating material of the present disclosure. A content of the curing catalyst is 0.5 wt % to 2 wt % of the heat-resistant silicone resin. That is, the content of the curing catalyst can be any positive real number ranging between 0.5 wt % and 2 wt %, e.g., 0.5 wt %, 1 wt %, 1.5 wt %, or 2 wt %. If the content of the curing catalyst is less than 0.5 wt %, a curing effect of the curing catalyst is limited. If the content of the curing catalyst is greater than 2 wt %, a curing speed of the high-temperature-resistant and anti-corrosion coating material may be too fast for coating. In one exemplary embodiment, the content of the curing catalyst is 1.0 wt % to 1.5 wt % of the heat-resistant silicone resin. In the present disclosure, a film-forming temperature of the high-temperature-resistant and anti-corrosion coating material can be, for example, more than or equal to 10° C., and is preferably more than or equal to 25° C.

In the present disclosure, the components (e.g., the heat-resistant silicone resin, the fillers, and the film-forming aid) of the high-temperature-resistant and anti-corrosion coating material can be mixed in the solvent. In order to evenly mix the components used in the high-temperature-resistant and anti-corrosion coating material of the present disclosure, the solvent is selected from the group consisting of toluene, xylene, and an aromatic solvent. In one embodiment of the present disclosure, based on the total weight of the high-temperature-resistant and anti-corrosion coating material, a content of the solvent ranges between 15 wt % and 30 wt %, and preferably ranges between 20 wt % and 28 wt %.

Second Embodiment

A second embodiment of the present disclosure provides a method for manufacturing the high-temperature-resistant and anti-corrosion coating material. The method at least includes a filler-preparing step, a pre-dispersing step, and a mixing step. The fillers of the present disclosure are made of specific types at specific ratios. Hence, during preparation of the fillers, 30 wt % to 45 wt % of the fillers are firstly prepared based on the weight ratio of the metal fillers to the sheet fillers within a range between 1:2 and 1:3.

Mixing the metal fillers and the sheet fillers in the resin at the same time may result in a poor dispersion effect. As such, during manufacturing of the high-temperature-resistant and anti-corrosion coating material of the present disclosure, a pre-dispersion is preferably prepared in advance. In other words, 20 wt % to 40 wt % of the heat-resistant silicone resin, the sheet fillers, and 0.5 wt % to 5 wt % of the film-forming aid are pre-dispersed in a homogenizer, so as to obtain the pre-dispersion. Afterwards, the metal fillers and 15 wt % to 30 wt % of the solvent are added into the pre-dispersion and evenly stirred by a mixer, so as to obtain the high-temperature-resistant and anti-corrosion coating material of the present disclosure.

Furthermore, the curing catalyst can be added into the high-temperature-resistant and anti-corrosion coating material before coating, so as to facilitate curing of a coating film. The content of the curing catalyst is 0.5 wt % to 2 wt % of the heat-resistant silicone resin. The curing catalyst can be, for example, alkoxysilane. However, the aforementioned examples describe only one of the embodiments of the present disclosure, and the present disclosure is not intended to be limited thereto.

In order to demonstrate that the high-temperature-resistant and anti-corrosion coating material of the present disclosure does not crack at a high temperature, a comparison is made between the high-temperature-resistant and anti-corrosion coating material of the present disclosure and a conventional inorganic metal coating material. In the present embodiment, the high-temperature-resistant and anti-corrosion coating material includes 27 wt % of the heat-resistant silicone resin, 40 wt % of the fillers, 3 wt % of the film-forming aid, and 30 wt % of the solvent, and specific components thereof are the same as those of Table 1. The inorganic metal coating material is an inorganic zinc powder coating material. Comparison results are shown in Table 4 below.

TABLE 4

| | Inorganic metal (zinc powder) coating material | Organic high-temperature-resistant coating material of the present disclosure |
|---|---|---|
| Testing of adhesive force (cross-cut test) | 3B | 5B |
| Pull-out force (MPa) at a high temperature of 450° C. for 24 hours | 2.0 | 3.8 |

As shown in Table 4, compared with the inorganic metal coating material, the high-temperature-resistant and anti-corrosion coating material of the present disclosure has a higher adhesive force and a higher pull-out force, so as to improve poor adhesion of the conventional inorganic metal coating material. That is to say, an organic coating material is used in the present disclosure to replace a conventional inorganic coating material, so that the high-temperature-resistant and anti-corrosion coating material can have improved resistance and adhesion. Specifically, a coefficient of expansion of the high-temperature-resistant and anti-corrosion coating material of the present disclosure ranges between 25 um/m° C. and 50 um/m° C., so as to provide improved resistance and adhesion.

In the present disclosure, the pencil hardness of the surface layer can be obtained in the following manner: evenly applying an anti-corrosion coating material to a flat board at a thickness of 100 μm; and using, after the anti-corrosion coating material is cured and dried, pencils with different degrees of hardness to produce scratches until the surface of the coating film exhibits plastic deformation (permanent indentation), cohesive failure (abrasion or cuts), or a combination thereof.

Through a cross-cut test, adhesion of the coating film can be examined. A cross-cut tester is used to draw lines on the coating film, and then an adhesive tape is adhered to and removed from the coating film that is cut. Based on an overall area of the original coating film being 100%, a percentage of an area of the coating film that is peeled off after removal of the adhesive tape is calculated. Said percentage indicates a degree of peeling off of the coating film, and is used for evaluating adhesion of the coating film. Here, 5B indicates that edges of an incision are completely smooth and there is no peeling off along an edge of a grid, 4B indicates that an actual damage within a lattice area is less than or equal to 5%, 3B indicates that a peeled-off area ranges between 5% and 15%, 2B indicates that the peeled-off area ranges between 15% and 35%, 1B indicates that the peeled-off area ranges between 35% and 65%, and 0B indicates that the peeled-off area is greater than 65%.

The anti-corrosion coating material is coated onto a metal layer for curing and drying, so as to form a coating. After a high-temperature (450° C.) treatment for 24 hours, a pull-out force test can be conducted. That is, a pressure sensor is used to measure a release force when separating the coating from the metal layer, and the measured data is used as the pull-out force (MPa) of the anti-corrosion coating material after being heated.

In the present disclosure, a coating having a thickness of 60 μm is used for testing the gas transmission rate and the water vapor transmission rate. The (oxygen) gas transmission rate (OTR) is measured according to the ISO 15105-1 standard (23° C.; 100% O2; 0% RH), and the water vapor transmission rate (WVTR) is measured according to the ISO 15106-2 standard (38° C.; 90% RH).

Beneficial Effects of the Embodiments

In conclusion, in the high-temperature-resistant and anti-corrosion coating material and the method for manufacturing the same provided by the present disclosure, by virtue of "the fillers including metal fillers and sheet fillers" and "a weight ratio of the metal fillers to the sheet fillers ranging between 1:2 and 1:3," the high-temperature-resistant and anti-corrosion coating material can have improved adhesion and an improved anti-corrosion effect.

In the present disclosure, based on the total weight of the methyl and the phenyl in the heat-resistant silicone resin, the content of the methyl ranges between 20% and 35%, and the content of the phenyl ranges between 65% and 80%. The methyl-phenyl-modified silicone resin obtained in this manner has a viscosity ranging between 20 $mm^2/s$ and 100 $mm^2/s$. Accordingly, the methyl-phenyl-modified silicone resin of the present disclosure can have the optimal hardness and heat resistance, and is particularly suitable for being applied to the high-temperature-resistant and anti-corrosion coating.

In addition, the fillers in the high-temperature-resistant and anti-corrosion coating of the present disclosure are a mixture of the metal fillers and the sheet fillers at a specific ratio, so as to obtain an improved adhesive force and an improved pull-out force. Specifically, when the ratio of the metal fillers to the sheet fillers is 1:2 and 1:3, the pencil hardness of the surface layer is most appropriate (4H), and the adhesive force and the pull-out force are also sufficiently high.

Furthermore, compared with using only one type of the sheet fillers, using the mixture of the magnesium talc and the glass flakes allows the sheet fillers having different diameters to be evenly and densely adhered to the coating surface. Specifically, the weight ratio of the magnesium talc to the glass flakes ranges between 2:1 and 1:2, so that the anti-corrosion effect of the high-temperature-resistant and anti-corrosion coating can be further enhanced. As such, the outer surface of high-temperature storage tanks, pipelines, or apparatuses can be coated with the high-temperature-resistant and anti-corrosion coating material of the present disclosure for effectively enhancing the weather resistance thereof.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A high-temperature-resistant and anti-corrosion coating material, comprising:

20 wt % to 40 wt % of a heat-resistant silicone resin;

30 wt % to 45 wt % of fillers;

0.5 wt % to 5 wt % of a film-forming aid; and 15 wt % to 30 wt % of a solvent;

wherein the fillers include metal fillers and sheet fillers, and a weight ratio of the metal fillers to the sheet fillers ranges between 1:2 and 1:3.

2. The high-temperature-resistant and anti-corrosion coating material according to claim 1, wherein the heat-resistant silicone resin is a methyl-phenyl-modified silicone resin, an epoxy resin-modified silicone resin, and a polyester-modified silicone resin.

3. The high-temperature-resistant and anti-corrosion coating material according to claim 2, wherein, in the methyl-phenyl-modified silicone resin, a content of methyl ranges between 20% and 35%, and a content of phenyl ranges between 65% and 80%.

4. The high-temperature-resistant and anti-corrosion coating material according to claim 2, wherein a viscosity of the methyl-phenyl-modified silicone resin ranges between 20 $mm^2/s$ and 100 $mm^2/s$.

5. The high-temperature-resistant and anti-corrosion coating material according to claim 1, wherein the fillers are selected from the group consisting of an aluminum powder, a zinc powder, a talc powder, aluminum magnesium talc, magnesium talc, glass flakes, and silicone talc.

6. The high-temperature-resistant anti-corrosion coating material according to claim 1, wherein the sheet fillers include magnesium talc and glass flakes.

7. The high-temperature-resistant and anti-corrosion coating material according to claim 6, wherein a weight ratio of the magnesium talc to the glass flakes ranges between 2:1 and 1:2.

8. The high-temperature-resistant and anti-corrosion coating material according to claim 6, wherein a diameter of the glass flake is greater than a diameter of the magnesium talc.

9. The high-temperature-resistant and anti-corrosion coating material according to claim 6, wherein a diameter of the magnesium talc ranges between 3 μm and 5 μm, and a diameter of the glass flake ranges between 10 μm and 20 μm.

10. The high-temperature-resistant and anti-corrosion coating material according to claim 1, wherein the film-forming aid is selected from the group consisting of alcohol ethers, alcohol zirconium, a mixture of 2-butoxyethanol and dipropylene glycol butyl ether, and a plasticizer.

11. The high-temperature-resistant and anti-corrosion coating material according to claim 1, wherein the solvent is selected from the group consisting of toluene, xylene, and an aromatic solvent.

12. The high-temperature-resistant and anti-corrosion coating material according to claim 1, further comprising:

a curing catalyst;

wherein a content of the curing catalyst is 0.5 wt % to 2 wt % of the heat-resistant silicone resin.

13. A method for manufacturing a high-temperature-resistant and anti-corrosion coating material, comprising:

preparing 30 wt % to 45 wt % of fillers based on a weight ratio of metal fillers to sheet fillers within a range between 1:2 and 1:3;

pre-dispersing 20 wt % to 40 wt % of a heat-resistant silicone resin, the sheet fillers, and 0.5 wt % to 5 wt % of a film-forming aid, so as to obtain a pre-dispersion; and adding the metal fillers and 15 wt % to 30 wt % of a solvent into the pre-dispersion, and stirring evenly, so as to obtain the high-temperature-resistant and anti-corrosion coating material.

14. The method according to claim 13, wherein a refractive index of the heat-resistant silicone resin ranges between 1.40 and 1.53, and a viscosity of the heat-resistant silicone resin ranges between 20 $mm^2/s$ and 100 $mm^2/s$.

15. The method according to claim 13, wherein the heat-resistant silicone resin is a methyl-phenyl-modified silicone resin; wherein, in the methyl-phenyl-modified silicone resin, a content of methyl ranges between 20% and 35%, and a content of phenyl ranges between 65% and 80%.

16. The method according to claim 13, wherein the sheet fillers include magnesium talc and glass flakes, and a weight ratio of the magnesium talc to the glass flakes ranges between 2:1 and 1:2.

17. The method according to claim 13, wherein the film-forming aid is selected from the group consisting of alcohol ethers, alcohol zirconium, a mixture of 2-butoxyethanol and dipropylene glycol butyl ether, and a plasticizer.

18. The method according to claim 13, wherein the solvent is selected from the group consisting of toluene, xylene, and an aromatic solvent.

19. The method according to claim 13, further comprising:

adding a curing catalyst into the high-temperature-resistant and anti-corrosion coating material before use;

wherein a content of the curing catalyst is 0.5 wt % to 2 wt % of the heat-resistant silicone resin.

20. The method according to claim 19, wherein the curing catalyst is alkoxysilane.

* * * * *